US007508298B2

(12) United States Patent
Pisz et al.

(10) Patent No.: US 7,508,298 B2
(45) Date of Patent: Mar. 24, 2009

(54) AUTOMATIC CRASH NOTIFICATION USING PRERECORDED MESSAGES

(75) Inventors: James T. Pisz, Huntington Beach, CA (US); Michelle L. Avary, Los Angeles, CA (US)

(73) Assignee: Toyota Motor Sales U.S.A., Inc., Torrance, CA (US)

( * ) Notice: Subject to any disclaimer, the term of this patent is extended or adjusted under 35 U.S.C. 154(b) by 255 days.

(21) Appl. No.: 11/279,020

(22) Filed: Apr. 7, 2006

(65) Prior Publication Data

US 2006/0226960 A1 Oct. 12, 2006

Related U.S. Application Data

(60) Provisional application No. 60/670,109, filed on Apr. 11, 2005.

(51) Int. Cl.
*B60Q 1/00* (2006.01)

(52) U.S. Cl. .................... 340/436; 340/539.1; 455/521; 379/45

(58) Field of Classification Search ................. 340/436, 340/435, 539.1; 455/404.1, 404.2, 521; 379/45
See application file for complete search history.

(56) References Cited

U.S. PATENT DOCUMENTS

| | | | | |
|---|---|---|---|---|
| 3,914,692 A | | 10/1975 | Seaborn, Jr. | |
| 4,172,969 A | | 10/1979 | Levine et al. | |
| 5,223,844 A | | 6/1993 | Mansell et al. | |
| 5,574,771 A | * | 11/1996 | Driessen et al. | 455/413 |
| 5,699,057 A | | 12/1997 | Ikeda et al. | |
| 5,742,233 A | | 4/1998 | Hoffman et al. | |
| 5,742,666 A | | 4/1998 | Alpert | |
| 5,933,080 A | | 8/1999 | Nojima | |
| 6,405,033 B1 | * | 6/2002 | Kennedy et al. | 455/414.1 |
| 6,526,335 B1 | | 2/2003 | Treyz et al. | |
| 6,642,844 B2 | | 11/2003 | Montague et al. | |
| 6,675,006 B1 | | 1/2004 | Diaz et al. | |
| 6,711,399 B1 | * | 3/2004 | Granier | 455/404.1 |

(Continued)

OTHER PUBLICATIONS

International Search Report for PCT Application Serial No. PCT/US06/13228, mailed Sep. 28, 2007.

(Continued)

*Primary Examiner*—Daniel Wu
*Assistant Examiner*—Hongmin Fan
(74) *Attorney, Agent, or Firm*—McDermott Will & Emery LLP

(57) ABSTRACT

An automatic crash notification system may include a crash detection system configured to detect a crash of the vehicle, a memory system containing a first prerecorded message that includes one or more words that mean that a remote location has received notice of a crash, a wireless communication system configured to wirelessly transmit a message to and wirelessly receive a message from a remote location, a user communication system configured to deliver words to an occupant of the vehicle, and a processing system. The processing system may be configured to transmit notice of a crash over the wireless communication system to a remote location in response to detection of the crash by the crash detection system, and cause the first prerecorded message to be communicated over the user communication system in response to receipt by the wireless communication system of an acknowledgement from the remote location that the remote location has received notice of the crash.

24 Claims, 5 Drawing Sheets

U.S. PATENT DOCUMENTS

| | | | | |
|---|---|---|---|---|
| 6,812,832 | B2 | 11/2004 | Lobaza et al. | |
| 6,873,837 | B1 | 3/2005 | Yoshioka et al. | |
| 2002/0177428 | A1 * | 11/2002 | Menard et al. | 455/404 |
| 2004/0203696 | A1 | 10/2004 | Jijina et al. | |
| 2004/0212503 | A1 * | 10/2004 | Stilp | 340/572.1 |
| 2004/0214553 | A1 | 10/2004 | Kang et al. | |
| 2005/0037730 | A1 * | 2/2005 | Montague | 455/404.2 |
| 2005/0075921 | A1 | 4/2005 | Hayes-Roth | |
| 2005/0076096 | A1 | 4/2005 | Nishibe et al. | |
| 2005/0264403 | A1 * | 12/2005 | Nobusawa | 340/436 |
| 2006/0002123 | A1 | 1/2006 | Hutzel et al. | |
| 2007/0136078 | A1 * | 6/2007 | Plante | |
| 2007/0152804 | A1 * | 7/2007 | Breed et al. | |
| 2007/0155427 | A1 * | 7/2007 | Tran | |

OTHER PUBLICATIONS

OnStar Technology. Technical Data found at web page http://www.onstar.com/us_english/jsp/explore/onstar_basics/technology.jsp on Mar. 10, 2006.

* cited by examiner

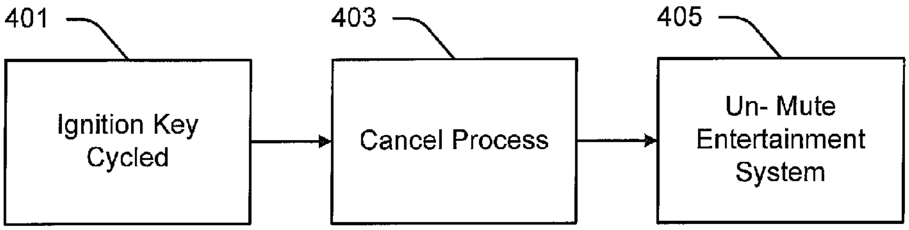

Fig. 4

| Message | Language |
|---|---|
| Crash Detected (step 205) | "A crash has been detected. If you do not want or need help, press the red emergency cancellation button located on the dashboard." |
| Notice of Crash Transmitted (step 209) | "Notice of this crash has been transmitted to a call center. If you do not want or need help, press the red emergency cancellation button located on the dashboard." |
| Notice of Crash Received (step 213) | "The call center has acknowledged receiving notice of the crash and is requesting a local emergency service provider to provide help. If you do not want or need help, press the red emergency cancellation button located on the dashboard." |
| Confirmation Required (step 305) | "You are attempting to cancel a request for help from an emergency service provider. Press the red cancellation button again within 10 seconds to cancel the request for help." |
| Crash Not Detected (step 307) | "No crash has been detected. Your request to cancel automated vehicle crash notification has been ignored." |
| Canceled (step 319) | "The request for help from your local emergency service provider has been canceled." |

Fig. 5

AUTOMATIC CRASH NOTIFICATION USING PRERECORDED MESSAGES

CROSS-REFERENCE TO RELATED APPLICATION

This application is based upon and claims priority to U.S. Provisional Application Ser. No. 60/670,109, entitled "Air Bag Beacon," filed Apr. 11, 2005. The entire content of this application is incorporated herein by reference.

BACKGROUND

1. Field

Automatic crash notification.

2. Description of Related Art

Automatic crash notification systems and methods may detect a vehicle crash and issue a request for help to a call center. An operator at the call center may communicate verbally with an occupant of the vehicle to confirm that the call for help has been received.

Such systems and methods may require a voice to be communicate over a communication channel. The call center operator may need to spend time participating in the conversation and to be trained to skillfully handle this type of conversation. These attributes may add to the cost of the service.

SUMMARY

An automatic crash notification system may include a crash detection system configured to detect a crash of a transportation system, a memory system containing a first prerecorded message that includes one or more words that mean that a remote location has received notice of a crash, a wireless communication system configured to wirelessly transmit a message to and wirelessly receive a message from a remote location, a user communication system configured to deliver words to an occupant of the transportation system, and a processing system. The processing system may be configured to transmit notice of a crash over the wireless communication system to a remote location in response to detection of the crash by the crash detection system. The processing system may also be configured to cause the first prerecorded message to be communicated over the user communication system in response to receipt by the wireless communication system of an acknowledgement from the remote location that the remote location has received notice of the crash, but that does not include the prerecorded message.

The memory system may contain the first prerecorded message in multiple languages. The processing system may be configured to select the language to be communicated.

The wireless communication system may be configured not to transmit or receive words.

The wireless communication system may include a cell phone. The cell phone may be configured to communicate over an agnostic cellular network.

The wireless communication system may be configured to communicate over a satellite communication system.

The first prerecorded message may include one or more words that mean that the remote location has summoned help.

The transportation system may include an entertainment system. The processing system may be configured to mute the sound from the entertainment system in response detection of a crash by the crash detection system.

The automatic crash notification system may include a GPS receiver configured to generate location information indicative of the location of the transportation system. The processing system may be configured to cause the location information to be included in the notice of the crash that is transmitted to the remote location.

The automatic crash notification system may include a user-actuated cancel control. The processing system may be configured to transmit a cancellation notice over the wireless communication system to the remote location in response to actuation of the user-actuated cancel control. The memory system may contain a second prerecorded message that includes one or more words that mean that a remote location has received a cancellation notice. The processing system may be configured to cause the second prerecorded message to be communicated over the user communication system in response to receipt by the wireless communication system of an acknowledgement from the remote location that the remote location has received a cancellation notice.

The user communication system may include a sound system. The processing system may be configured to cause the one or more words to be played over the sound system.

The user communication system may include a display. The processing system may be configured to cause the one or more words to be displayed on the display.

The crash detection system may be configured to detect the crash of a vehicle.

These systems may also implement related processes.

The prerecorded message may instead be stored at and played back from the remote location.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

FIG. 4 is a flow diagram of another cancellation process for the automatic crash notification process shown in FIG. 2.

FIG. 5 is a table of prerecorded messages that may be played as part of the automatic crash notification processes shown in FIGS. 2, 3(*a*), and 3(*b*).

DETAILED DESCRIPTION OF ILLUSTRATIVE EMBODIMENTS

Figure 1:
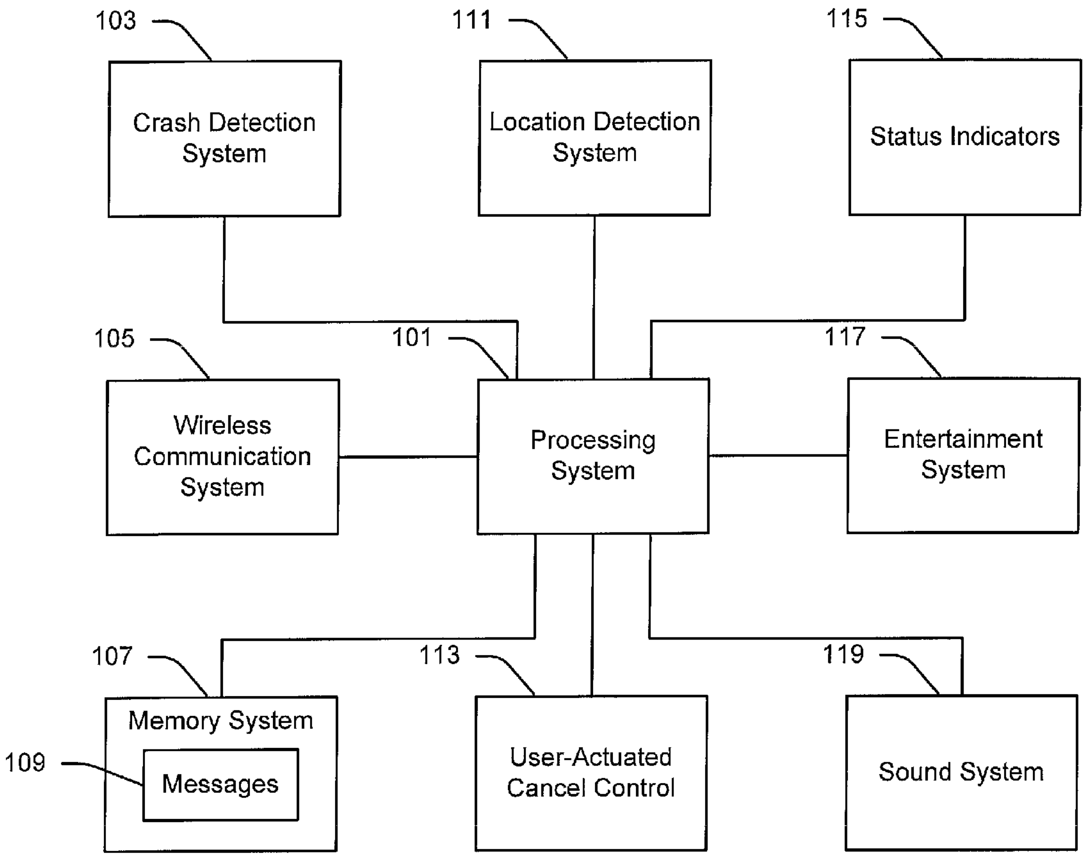
FIG. 1 is a block diagram of an automatic crash notification system using prerecorded messages.

FIG. 1 is a block diagram of an automatic crash notification system using prerecorded messages. As shown in FIG. 1, a processing system 101 may be configured to communicate with a crash detection system 103, a two-way wireless communication system 105, a memory system 107 containing one or more messages 109, a location detection system 111, a user-actuated cancel control 113, status indicators 115, entertainment system 117, and a sound system 119.

The crash detection system 103 may be any type of system that is configured to detect a crash of a vehicle. The system may include one or more crash sensors mounted on the vehicle at one or more strategic locations, such as on one or more bumpers and/or one or more sides of the vehicle. The crash detection system 103 may instead or in addition include one or more sensors that are configured to detect the deployment of an air bag. One or more of the sensors may be an existing part of the vehicle and may be utilized for other purposes. The crash detection system 103 may include a user-actuate control (e.g., a push-button on the dashboard) that an occupant of the vehicle may actuate following a crash as an alternate or additional means of detecting a crash.

The crash detection system 103 may be configured to communicate that a crash has occurred when an air bag sensor signals that an airbag has been deployed or when a rear-end sensor signals that there has been a rear-end crash (which usually does not trigger an airbag). The crash detection system 103 may be configured to ignore signals from a rear-end sensor that are below a pre-determined threshold on the assumption that such a crash does not warrant a call for help.

The wireless communication system 105 may be configured to wirelessly transmit data, voice, and/or other information to a location that is remote from the vehicle, such as to a call center, and to wirelessly receive data, voice, and/or other information from that remote location. The wireless communication system 105 may be any type of wireless communication system. It may be a stand-alone system dedicated to the functions of the automatic vehicle crash notification system or it may provide other types of communication services. For example, the wireless communication system 105 may also serve to send communications to and/or to receive communications from a vehicle service center that relate to needs to have the vehicle serviced.

The wireless communication system 105 may include a cell phone. When not used for automatic crash notification, the cell phone may be used for other purposes, such as for conversation. The cell phone may be configured to communicate over an agnostic cellular network. The wireless communication system 105 may in addition or instead be configured to communicate over a satellite communication system, such as the ORBCOMM satellite communication system. The wireless communication system 105 may in addition or instead include a pager, such as a pager configured to communicate over the reflex pager network. The wireless communication system 105 may include any combination of one or more of these communication systems and/or of other communication systems.

The same communication channel and/or system may be used for both transmission and reception by the wireless communication system 105. Different communication channels and/or systems may in addition or instead be used for transmission and reception.

The information that is transmitted over one or more of the communication channels used by the wireless communication system 105 may be configured not to transmit or receive words. In an alternate embodiment, words may also or instead be communicated over one or more of these channels.

The memory system 107 may be any type of memory system, such as one or more ROMs, PROMs, ePROMs, memory cards, floppy disks, magnetic tapes, magnetic cards, CDs, DVDs, hard drives, and/or any other type of memory device. The memory system 107 may include one of more of these memory devices at a single location or at distributed locations.

Each message 109 that is stored within the memory system 107 may be prerecorded and include one or more words that have a certain meaning, as will be explained in more detail below. The one or more words in each message 109 may be an analog or digital recording of a real person's voice, text data that may be converted to audible words by a text-to-speech processor, data that represents phonemes that may be converted to audible words by a phoneme-to-speech converter, data that represents a set of words in a dictionary of stored words, and/or in any other format that may be recalled and communicated to an occupant of the vehicle in an audible format.

Each message 109 that is stored in the memory system 107 may be stored in various formats. For example, each message may be stored in various languages, such as English, Spanish, French, and Italian. Similarly, each message may be stored in different voices, such a female voice and a male voice. Each message may also be stored in different versions, such as in a long version and a short version. The processing system 101 may correspondingly be configured to select the particular format to use, such as the particular language, the sex of the voice, and whether to use the long or short version. This selection may be based on input from a user.

The location detection system 111 may be any type of apparatus configured to detect and communicate the location of the vehicle. The location detection system 111 may include a GPS receiver. That receiver may be part of a cell phone. The very same cell phone may also be part of the wireless communication system 105.

The user-actuated cancel control 113 may be any type of control that may be actuated by a user. It may include, for example, a mechanical switch, such as a red push button. A touch pad or touch screen may instead or in addition be used. The user-actuated cancel control 113 may be positioned anywhere, such as on the dashboard of the vehicle or in a wireless remote control.

The status indicators 115 may be one or more indicators of any type that are configured to communicate information about the status of the automatic crash notification system to an occupant of the vehicle. The status indicators 115 may include LEDs, a display, or any other type of indicating device. The status indicators 115 may be configured in conjunction with the processing system 101 to indicate a broad variety of information about the status of the automatic crash notification system. Examples include that the system is on and functioning, that there has been a diagnostic error, that a subscription for an emergency notification service has expired, that notice of a crash has been transmitted, that transmission of a notice of crash has been acknowledged, that cancellation of a notice of crash has been transmitted, and/or that a transmitted cancellation notice has been received.

The entertainment system 117 may be one or more of any type of entertainment systems in the vehicle. These may include one or more radios, CD players, DVD players, MPG players, and video players, and TVs. The systems may be configured for operation from a front seat of the vehicle, a rear seat, remotely, and/or a trunk.

The sound system 119 may be any type of apparatus configured to audibly deliver words to an occupant of the vehicle. It may include, for example, an amplifier and loud speaker. Although illustrated in FIG. 1 as separate from the entertainment system 117, the sound system 119 may be a part of the entertainment system 117.

The processing system 101 may be any type of processing system. The processing system 101 may be configured to perform the functions and operations described herein, as well as other functions and operations. The processing system 101 may include a dedicated computer, dedicated to performing the needed functions and operations. It may in addition or instead include a general purpose computer, programmed to perform these functions and operations. The processing system 101 may have only a single processor or may have multiple processors working together.

The automatic vehicle crash notification system shown in FIG. 1 may be attached to or installed in any portion of the vehicle. Its various components may be at a single location or may be at different locations. One or more components of the system may be installed by the manufacturer, distributor, and/or dealer of the vehicle before it is sold, or may be installed afterwards. One or more of its components may also serve as components of a vehicle computer network (CAN) system. For example, the functions of the processing system 101 and the memory system 107 may be implemented by one of the processing systems and memories that are in a vehicle computer network.

The automatic vehicle crash notification system shown in FIG. 1 may include a back-up battery (not shown) to power the system in the event that a crash damages the normal battery in the vehicle.

One or more of the functions and operations performed by the crash detection system 103, the wireless communication system 105, the memory system 107, the location detector 111, the user-actuated cancel control 113, the status indicators 115, the entertainment system 117, and the sound system 119 may be performed by the processing system 101 and/or vice versa.

Figure 2:
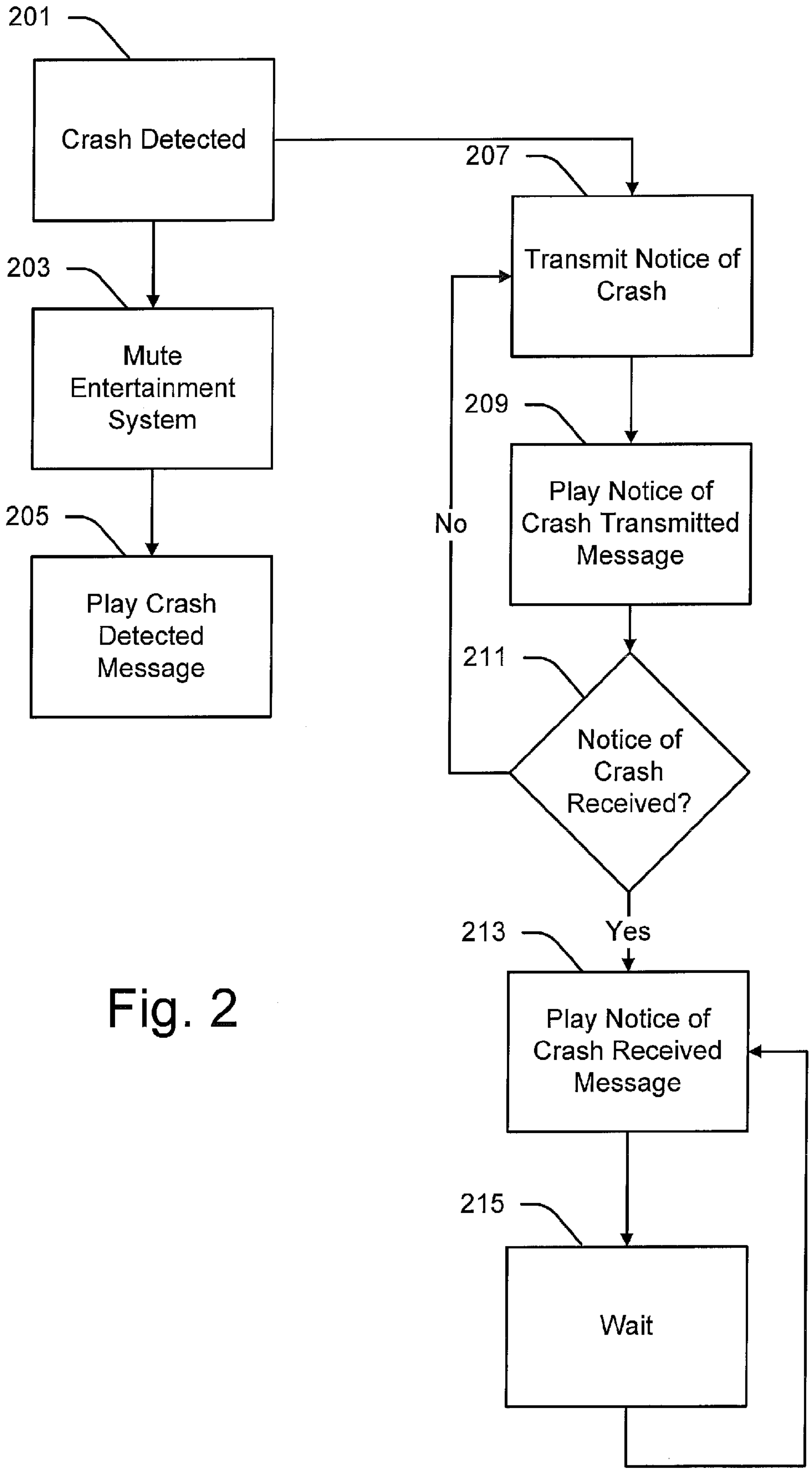
FIG. 2 is a flow diagram of an automatic crash notification process using the automatic crash notification system shown in FIG. 1.

FIG. 2 is a flow diagram of an automatic crash notification process using the automatic crash notification system shown in FIG. 1. The process illustrated in FIG. 2 may be performed by other automatic crash notification systems, and the automatic crash notification system shown in FIG. 1 may be used to perform other processes.

The crash detection system 103 may detect a crash, as reflected by a Crash Detected step 201. The processing system 101 may receive notice of this communication from the crash detection system 103 and, in response, mute the entertainment system 117, as reflected by a Mute Entertainment System step 203. This may cause any sounds that were being issued by the entertainment system 117 to temporarily stop. The processing system 101 may be configured not to deactivate any blue-tooth hands-free functionality that may exist.

The processing system 101 may cause the sound system 119 to play one of the messages 109 that are stored in the memory system 107. For example, the processing system 101 may cause a message to be played that includes one or more words that mean that a crash has been detected, as reflected by a Play Crash Detected message step 205.

The processing system 101 may cause the wireless communication system 105 to transmit notice of the crash to a call center at a remote location, as reflected by a Transmit Notice of Crash step 207. The specifics of establishing a communication link with the call center may depend on the type of communication system that is used in the wireless communication system 105. When the wireless communication system 105 is utilizing a cell phone, for example, the Transmit Notice of Crash step 207 may include causing the cell phone to dial a pre-programmed emergency number.

The Transmit Notice of Crash step 207 may include transmission of a broad variety of information related to the crash. For example, the Transmit Notice of Crash step 207 may transmit information about the nature of the crash, such as whether the crash was an impact crash, a rollover, or a rear-end crash.

The transmitted information may include information about the location of the vehicle at the time of the crash. To facilitate this, the processing system 101 may obtain the location information from the location detection system 111. The transmitted location information may include information about the longitude and latitude of the vehicle.

The Transmit Notice of Crash step 207 may include information about the vehicle that was involved in the crash, such as its year, make, model, color, and/or VIN number.

The Transmit Notice of Crash step 207 may include information about the severity of the crash, the time of the crash, and/or pre-crash information, such as the speed of the vehicle prior to the crash.

The Transmit Notice of Crash step 207 may include information relevant to determining whether an air bag was deployed and, if so, whether that deployment was the result of a crash or a malfunction.

The processing system 101 may cause another of the messages 109 to be played over the sound system 119, such as a message that includes one or more words that mean that notice of the crash has been transmitted, as reflected by a Play Notice of Crash Transmitted Message step 209.

The processing system 101 may wait a pre-determined period, such as approximately five seconds, for the wireless communication system 105 to communicate to the processing system 101 that the notice of crash has been received, as reflected by a Notice of Crash Received? decision step 211. During this period, the call center may receive the notice of crash and transmit back to the wireless communication system 105 notice that it has been received.

If the processing system 101 does not receive notice that the call center has received the notice of crash within this period, the processing system 101 may cause the notice of crash to be re-transmitted, as reflected by return of the process to the Transmit Notice of Crash step 207. Process steps 207, 209 and 211 may repeat. This repetition may be useful when there is a temporary problem with the communication between the automatic crash notification system and the call center.

Once the wireless communication system 105 receives notice from the call center that the call center has received the notice of crash, the processing system 101 may cause another one of the messages 109 to be played over the sound system 119, such as a message that includes one or more words that mean that the transmitted notice of crash has been received by the call center, as reflected by a Play Notice of Crash Received Message step 213.

The processing system 101 may be configured to wait a pre-determined period, as reflected by a Wait step 215, and then return to the Play Notice of Crash Received Message step 213, thus causing this message to be periodically delivered to an occupant.

After receiving notice of the crash, the call center may utilize information that was transmitted as part of the notice of crash, such as vehicle location information, to determine the location of the vehicle. The call center may use this location information to identify emergency personnel in the locale of the vehicle. The call center may contact this emergency personnel and provide emergency information to the personnel, such as information about the identity and location of the vehicle. The emergency personnel may travel to the site of the crash and provide emergency assistance to the occupants of the vehicle.

Before communicating with emergency personnel, the call center may look up information in its own database that is related to the information that it received in the transmission from the vehicle. For example, the call center may look up the name of the operator of the vehicle and the type of emergency services to which the operator has subscribed. The call center may utilized this looked-up information as part of the process of deciding how to respond to the emergency transmission and/or may furnish all or portions of this looked-up information to the emergency personnel.

After the call center contacts emergency personnel, provides the emergency personnel with needed information, and/or receives confirmation from the emergency personnel that they will travel to the site of the crash and provide assistance, the call center may transmit back to the vehicle information indicating that it has summoned help. This transmission may be received by the wireless communication system 105 and delivered to the processing system 101. The processing system 101 may then cause the sound system 119 to play another one of the messages 109, such as a message that includes one or more words that mean that the remote location has summoned help. This summoned help message may be played in addition to the notice of crash received message that is played in the step 213. In another embodiment, this "help has been summoned" message may be played instead of the notice of crash received message that is played in step 213.

Figure 3A:
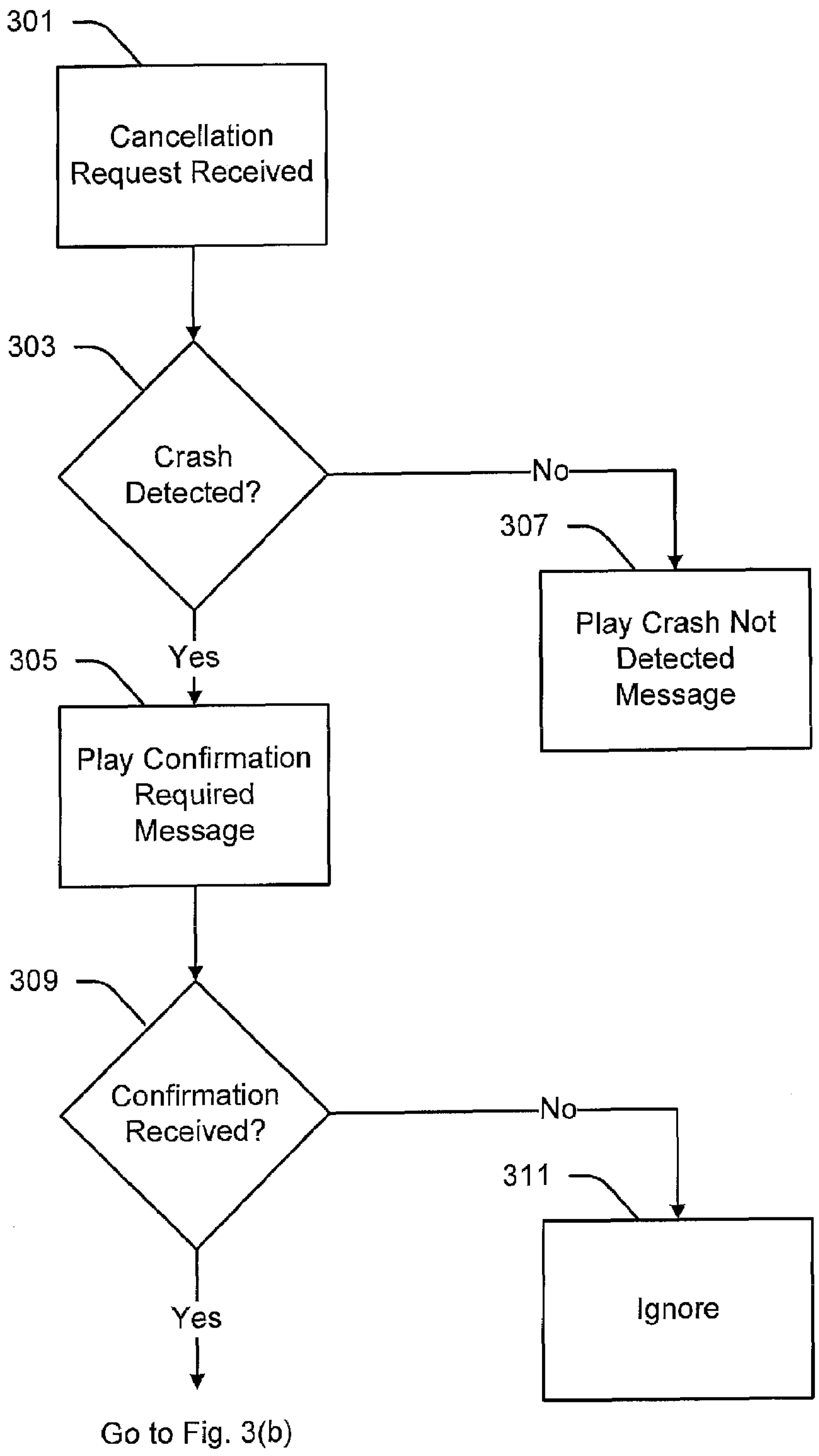
FIGS. 3(*a*) and 3(*b*) collectively show a flow diagram of a cancellation process for the automatic crash notification process shown in FIG. 2.
Figure 3B:
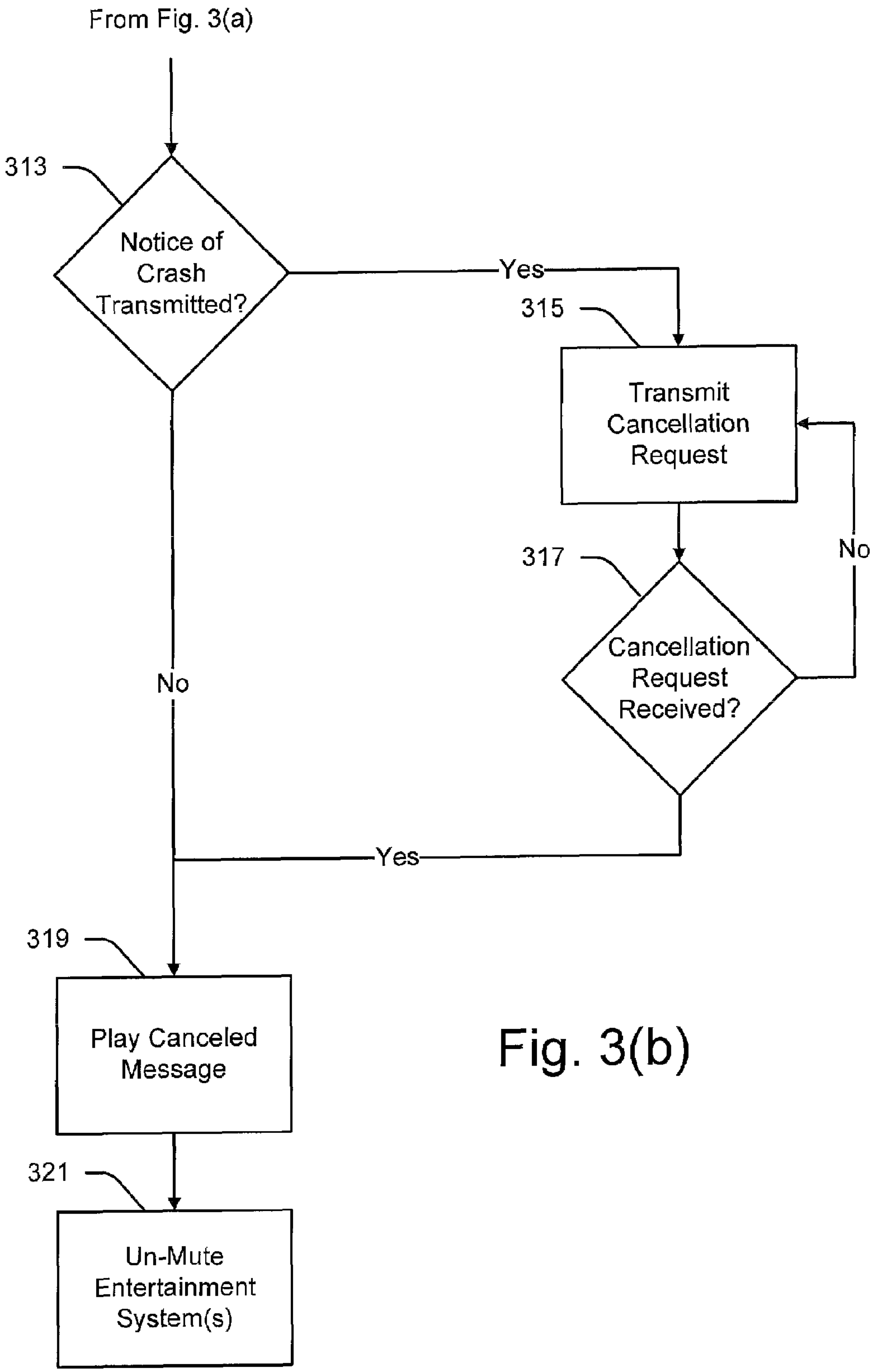

FIGS. 3(*a*) and 3(*b*) collectively show a flow diagram of a cancellation process for the automatic crash notification process shown in FIG. 2. The cancellation process shown in FIGS. 3(*a*)-(*b*) may be used in connection with other processes, and the automatic crash notification process shown in FIG. 2 may be used in connection with other cancellation processes.

At any time, an occupant of the vehicle (or any other person) may actuate the user-actuated cancel control 113. This may be done for the purpose of canceling the automatic crash notification process, such as when the accident is minor and help is not needed. This actuation may be detected by the processing system 101, as reflected by a Cancellation Request Received step 301.

The processing system 101 may check to determine whether a crash has been detected, as reflected by a Crash Detected? decision step 303. If it has not, the processing system may cause the sound system to play one of the messages 109 that include one or more words that mean that a crash has not been detected, as reflected by a Play Crash Not Detected Message step 307.

If a crash was detected prior to actuation of the user-actuated cancel control 113, the processing system 101 may cause the sound system 119 to play one of the messages 109 that includes one or more words that mean that the system recognizes that the user-actuated cancel control 113 has been activated, but requests confirmation before canceling the process, as reflected by a Play Confirmation Required Message step 305. This may help prevent an automatic crash notification from inadvertently being canceled.

The processing system 101 may wait a pre-determined period (e.g., approximately 10 seconds) during which the processing system may examine whether the occupant has confirmed the cancellation request, such as by again actuating the user-actuated cancel control 113, as reflected by a Confirmation Received? decision step 309. If confirmation of the cancellation is not received within the pre-determined period, the processing system 101 may simply ignore the request, as reflected by an Ignore step 311.

On the other hand, if confirmation is received within the pre-determined period, the processing system 101 may test to determine whether notice of the crash was already transmitted, as reflected in FIG. 3(*b*) by a Notice of Crash Transmitted? decision step 313. If it has, the processing system 101 may cause the wireless communication system 105 to transmit a request to the call center to cancel the request for emergency services, as reflected by a Transmit Cancellation Request step 315. The processing system 101 may wait a pre-determined period for a communication from the wireless communication system 105 indicating that the call center has received the cancellation request, as reflected by a Cancellation Request Received? decision step 317. If acknowledgment of the cancellation is not received within the pre-determined, the processing system 101 may cause the process to return to the Transmit Cancellation Request step 315, thus causing the cancellation request to be re-transmitted until its receipt is acknowledged.

Once acknowledgment of the cancellation request has been received during the step 317, or if the processing system determines that notice of the crash was not yet transmitted during the step 313, the processing system 101 may cause the sound system 119 to play one of the messages 109 that mean that the automatic crash notification process has been canceled, as reflected by a Play Canceled Message step 319. The processing system 101 may un-mute the entertainment system 117, as reflected in an Un-Mute Entertainment System step 321.

The Cancellation Request Received step 301 may serve as an interrupt to the process illustrated in FIG. 2. The process illustrated in FIG. 2 may resume after the interrupt is complete, such as after the Play Crash Not Detected Message step 307, after the Ignore step 311 and/or after the Un-Mute Entertainment System step 321.

FIG. 4 is a flow diagram of another cancellation process for the automatic crash notification process shown in FIG. 2. The process shown in FIG. 4 may be used with other automatic notification processes, and the automatic notification process shown in FIG. 2 may be used with other cancellation processes. The cancellation process shown in FIG. 4 may be used in addition to or instead of the cancellation process shown in FIGS. 3(*a*) and 3(*b*).

As shown in FIG. 4, a user may turn the ignition key off and back on, as reflected by an Ignition Key Cycled step 401. The processing system 101 may detect this sequence, interpret it as a request to cancel the automatic vehicle crash notification process, and cancel the process, as reflected by a Cancel Process step 403. The processing system 101 may un-mute the entertainment system 117, as reflected by an Un-mute Entertainment System step 405.

FIG. 5 is a table of words that may be used for one or more of the prerecorded messages that have been discussed above in connection with the processes discussed above, some of which are shown in FIGS. 2 and 3(*a*)-(*b*). These are merely illustrative. Shorter or longer versions, as well as versions with different words or in a different language may be used in addition or instead.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, the automatic vehicle crash notification systems and processes may be used in connection other types of transportation systems that may be subject to a crash, such as boats, trains or airplanes.

The call center may also provide other functions, such as storing all communications that the call center has had with all automatic vehicle crash notification systems.

Although messages have thus-far been described as only being delivered over a user communication system that is a sound system, such messages could in addition or instead be delivered over a user communication system that includes a displayed, such as a display in the vehicle. In this event, the messages 109 that are stored in the memory 107 may be in text format in addition or instead.

The wireless communication system 105 may also be configured to facilitate verbal communication between an occupant of the vehicle and the remote location.

The wireless communication system 105 may also be configured to receive a broad variety of system-level communications which may be processed appropriately by the processing system 101. For example, the status of any subscription that may be required for the services of the call center may be communicated from the call center to the wireless communication system 105. If payment for the subscription is current, this may be indicated by the received communication and may be used by the processing system 101 to activate an appropriate one of the status indicators 115. Conversely, if the subscription has expired, this may instead be indicated by the received communication and the processing system 101 may instead cause a different one of the status indicators 115 to be activated. The received system-level communications with the wireless communication system 105 may also include communications that add to and/or modify one or more of the messages 109. They may also include software updates that modify processes implemented by the processing system 101.

The memory system that stores the prerecorded messages may be located at the call center, rather than in the vehicle. In this embodiment, the prerecorded messages may be delivered from the call center to the vehicle for playback in the vehicle in response to an acknowledgement issued at the call center.

In short, the scope of protection is limited solely by the claims that now follow. That scope is intended to be as broad as is reasonably consistent with the language that is used in the claims and to encompass all structural and functional equivalents. Nothing that has been stated or illustrated is intended to cause a dedication of any component, step, feature, object, benefit, advantage, or equivalent to the public, regardless of whether it is recited in the claims.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

We claim:

1. An automatic crash notification system for automatically providing notice of a crash of a transportation system comprising:

a crash detection system located at the transportation system configured to detect the crash of the transportation system;

a memory system located at the transportation system containing a first prerecorded message that includes one or more words that mean that a remote location has received notice of a crash;

a wireless communication system located at the transportation system configured to wirelessly transmit a message to and wirelessly receive a message from a remote location;

a user communication system located at the transportation system configured to deliver words to an occupant of the transportation system; and a processing system located at the transportation system configured to:

transmit notice of a crash over the wireless user communication system to a remote location in response to detection of the crash by the crash detection system; and cause the first prerecorded message located at the transportation system to be communicated over the user communication system in response to receipt by the wireless communication system of an acknowledgement from the remote location that the remote location has received notice of the crash but which does not include the prerecorded message.

2. The automatic crash notification system of claim 1 wherein the memory system contains the first prerecorded message in multiple languages and wherein the processing system is configured to select the language to be communicated.

3. The automatic crash notification system of claim 1 wherein the wireless communication system is configured not to transmit or receive words.

4. The automatic crash notification system of claim 1 wherein the wireless communication system includes a cell phone.

5. The automatic crash notification system of claim 4 wherein the cell phone is configured to communicate over an agnostic cellular network.

6. The automatic crash notification system of claim 1 wherein the wireless communication system is configured to communicate over a satellite communication system.

7. The automatic crash notification system of claim 1 wherein the first prerecorded message includes one or more words that also mean that the remote location has summoned help.

8. The automatic crash notification system of claim 1 wherein the transportation system includes an entertainment system and wherein the processing system is configured to mute the sound from the entertainment system in response to detection of a crash by the crash detection system.

9. The automatic crash notification system of claim 1 further including a GPS receiver configured to generate location information indicative of the location of the transportation system and wherein the processing system is configured to cause the location information to be included in the notice of the crash that is transmitted to the remote location.

10. The automatic crash notification system of claim 1 further including a user-actuated cancel control and wherein the processing system is configured to transmit a cancellation notice over the wireless communication system to the remote location in response to actuation of the user-actuated cancel control after the processing system transmits notice of the crash over the wireless user communication system to the remote location in response to detection of the crash by the crash detection system.

11. The automatic crash notification system of claim 10 wherein the memory system contains a second prerecorded message that includes one or more words that mean that a remote location has received a cancellation notice and wherein the processing system is configured to cause the second prerecorded message to be communicated over the user communication system in response to receipt by the wireless communication system of an acknowledgement from the remote location that the remote location has received a cancellation notice.

12. The automatic crash notification system of claim 1 wherein the crash detection system is configured to detect the crash of a vehicle.

13. An automatic crash notification process for automatically detecting the crash of a transportation system comprising:

detecting a crash of a transportation system at the transportation system;

transmitting notice of the crash from the transportation system to a remote location in response to detection of the crash;

receiving an acknowledgement at the transportation system from the remote location that the remote location has received notice of the crash but that does not include any words; and in response to receipt of the acknowledgement, communicating over a user communication system that is part of the transportation system a first prerecorded message that was stored in the transportation system and that includes one or more words that mean that the remote location has received notice of the crash.

14. The automatic crash notification process of claim 13 wherein the process includes selecting the language of the message that is communicated.

15. The automatic crash notification process of claim 13 wherein words are not transmitted or received.

16. The automatic crash notification process of claim 13 wherein the transmitting and receiving are performed by a cell phone.

17. The automatic crash notification process of claim 16 wherein the transmitting and receiving are performed over an agnostic cellular network.

18. The automatic crash notification process of claim 13 wherein the transmitting and receiving are performed over a satellite communication system.

19. The automatic crash notification process of claim 13 wherein the first prerecorded message includes one or more words that also mean that the remote location has summoned help.

20. The automatic crash notification process of claim 13 wherein the process includes muting sound from an entertainment system in the transportation system in response detection of the crash.

21. The automatic crash notification process of claim 13 wherein the process includes generating location information indicative of the location of the transportation system and transmitting the location information as part of the notice of the crash.

22. The automatic crash notification process of claim 13 wherein the process includes actuating a user-actuated cancel control in the transportation system and transmitting a cancellation notice from the transportation system to the remote location in response to actuation of the user-actuated cancel control after the processing system transmits notice of the crash over the wireless user communication system to the remote location in response to detection of the crash by the crash detection system.

23. The automatic crash notification process of claim 22 wherein the process includes receiving an acknowledgement at the transportation system from the remote location that the remote location has received the cancellation notice and communicating a second prerecorded message that was stored in the transportation system that includes one or more words that mean that the remote location has received the cancellation notice in response to the acknowledgement of the cancellation notice.

24. The automatic crash notification process of claim 13 wherein the crash of a vehicle is detected.

* * * * *